United States Patent [19]
Biskup et al.

[11] Patent Number: 6,075,976
[45] Date of Patent: *Jun. 13, 2000

[54] COMMUNICATION APPARATUS COMPRISING TWO UNITS AND MEANS FOR SUPPORTING ONE UNIT ON THE OTHER

[75] Inventors: Daniel Robert Biskup, Somerset; Benny Sangyong Chi, Dumont; Chaonong Yoh, Matawan, all of N.J.

[73] Assignee: Lucent Technologies, Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/928,247

[22] Filed: Sep. 12, 1997

[51] Int. Cl.⁷ ....................................... H04M 1/00
[52] U.S. Cl. ................ 455/90; 455/95; 455/575
[58] Field of Search ..................... 379/424, 425, 379/426, 428, 433, 435, 436, 434, 440, 455, 447, 446, 454; 455/90, 575, 95

[56] References Cited

U.S. PATENT DOCUMENTS

| | | | |
|---|---|---|---|
| 4,543,451 | 9/1985 | Schoen | 379/434 |
| 4,881,258 | 11/1989 | Kaiwa et al. | 379/440 |
| 5,131,034 | 7/1992 | Read | 379/435 |
| 5,185,791 | 2/1993 | Itoyama et al. | 379/435 |
| 5,535,274 | 7/1996 | Braitberg et al. | 379/446 |
| 5,708,707 | 1/1998 | Haltunen et al. | 379/446 |
| 5,748,727 | 5/1998 | Lundell et al. | 379/435 |
| 5,828,750 | 10/1998 | Perala | 379/455 |
| 5,852,421 | 12/1998 | Maldonado | 455/90 |

*Primary Examiner*—Daniel S. Hunter
*Assistant Examiner*—Thuan T. Nguyen
*Attorney, Agent, or Firm*—Harry L. Newman

[57] ABSTRACT

Communication apparatus is disclosed that comprises a handset 100 that has an opening 182 in its lower end 180 and a base 200 that has a recess 220 that is shaped to accommodate the handset parallel to the base in either a face in or face out position, the recess having a securing element 300 in its lower end 225. The location of the opening in the lower end of the handset and the location of the securing element in the lower end of the recess is such that the securing element is in juxtaposition with the opening in the handset when the handset is placed in the recess in either the face in or face out positions.

5 Claims, 7 Drawing Sheets

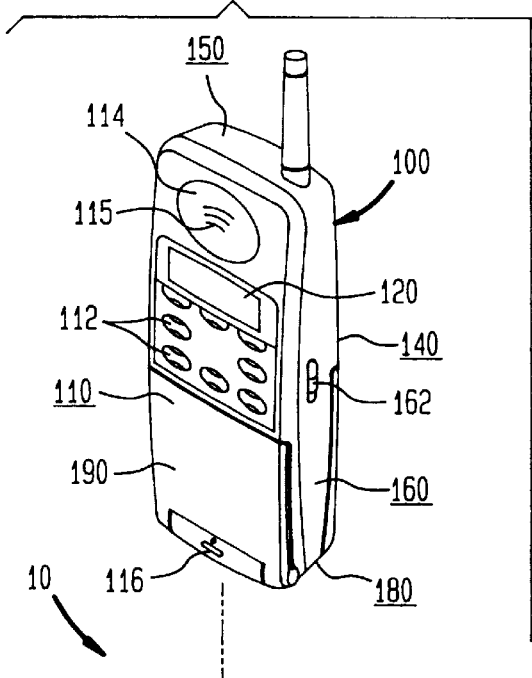
FIG. 1
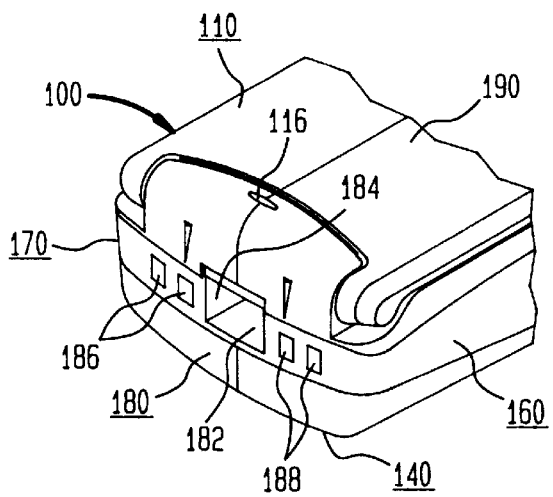
FIG. 2
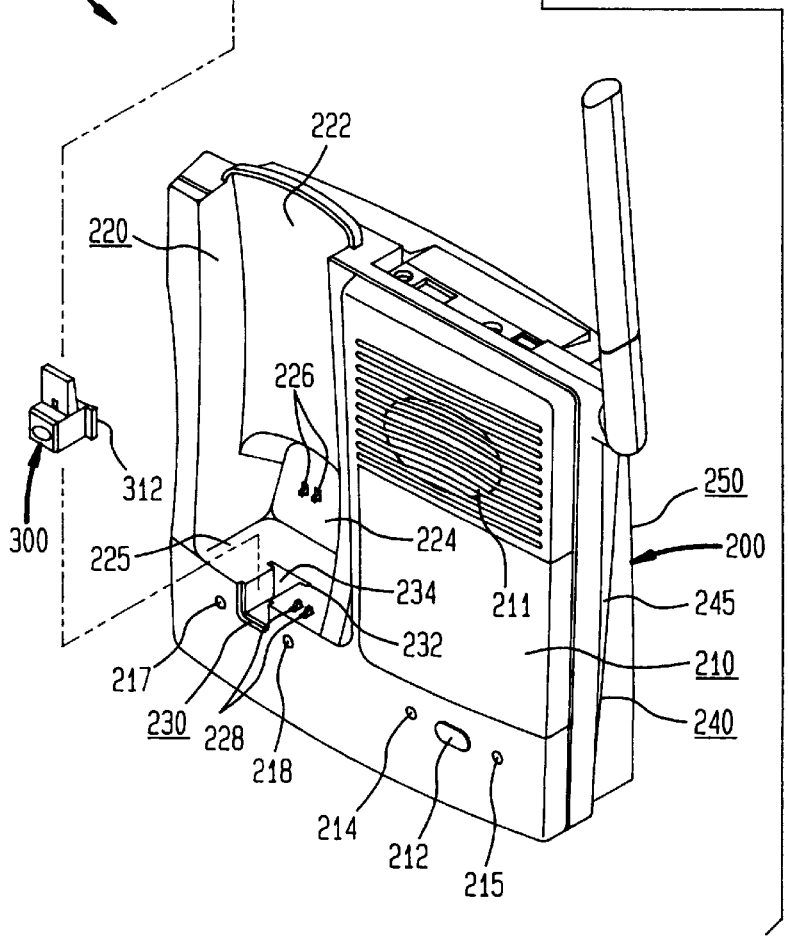

COMMUNICATION APPARATUS COMPRISING TWO UNITS AND MEANS FOR SUPPORTING ONE UNIT ON THE OTHER

TECHNICAL FIELD

This invention relates to communication apparatus including a hand held portion, commonly referred to as a handset, and a base on which the handset is positioned when it is at rest. More particularly, this invention relates to a handset and base interaction that enables the handset to be supported on the base in either a face in or face out position.

BACKGROUND OF THE INVENTION

The handset commonly employed in communication apparatus comprises a front that includes communication controls, such as push buttons for turning the communication apparatus on and off and a keyboard used for establishing a connection with other communication apparatus and/or transmitting information to other communication apparatus. The front may also include a display for displaying information transmitted or received. The handset further comprises a back, opposite to the front, that is adapted to be held in the palm of the users hand when the handset is removed from the base.

When the handset is placed on the base in the face in position, the front of the handset faces the base. This is the position in which, with few exceptions, all prior handsets are accommodated on its associated base. However, it is desirable to be able to support a handset on its associated base in both a face in position and a face out position in which the communication controls and display are accessible to the user while the handset is positioned on its associated base. The difficulty of providing this capability is increased by the fact that the base is typically designed to be used on both a horizontal surface and a vertical surface. Consequently, the interaction between the handset and the base must be such that the handset is supported on the base in either a face in or face out position while the base is positioned on either a horizontal or a vertical surface.

One line of cordless telephone sets is presently available that provides this capability. The handset has a pair of opposed recesses in its sides and the base has a pair of opposed spring loaded pins that when placed in registration with the recesses in the handset serve to support the handset on the base in both a face in and face out position while the base is in either a horizontal or a vertical position. This arrangement however suffers from a number of deficiencies. First, it requires some precision in positioning the handset on the base to assure registration of both recesses in the handset with both spring loaded pins in the base. Second, using multiple recesses and pins to accomplish the desired objective results in a complex structure which adds to its parts and assembly cost initially and to its repair cost subsequently. Third, the molding of recesses in the sides of the handset requires the use of a tool that is itself complex and expensive and requires more time to complete the molding operation. Finally, the recesses and pins are located toward the upper end of the handset and base and are therefore quite visible and believed to detract from the appearance of the telephone set.

SUMMARY OF THE INVENTION

Communication apparatus in accordance with the present invention provides an improvement over this prior art design in that the objective is accomplished with a handset that has a single opening in its lower end and a base that has a recess that is shaped to accommodate the handset in either a face in or face out position, the recess having a single securing element in its lower end. The location of the opening in the lower end of the handset and the location of the securing element in the lower end of the recess in the base is such that the securing element is in juxtaposition with the opening in the handset when the handset is placed in the recess in either a face in or face out position. In one illustrative embodiment of the invention, the securing element is reversible so that when the base is supported on a horizontal surface, the element is positioned so as to just engage the entrance of the opening, and when the base is supported on a vertical surface, the securing element is positioned so as to extend into the opening.

As a result of this relationship between the handset and the base, when the base is positioned on a horizontal surface, gravity essentially holds the handset within the recess of the base in either a face in or face out position. Thus, placing the handset into the recess in the desired orientation accomplishes the desired result. When, on the other hand, the base is positioned on a vertical surface, the normal downward movement of placing the handset into the recess in the base results in the securing element in the base being inserted into the opening in the handset to secure the handset to the base in either the face in or face out orientation.

The structure of the present invention involves fewer parts than the prior art structure and does not require a special molding tool. The cost of manufacturing the structure of the present invention is thereby reduced. Equally important, because the opening in the handset is in its lower end, the opening is to a large extent obscure. Similarly, because the securing element is located in the lower end of the recess in the base, it is also to a large extent obscure. Thus, the opening in the handset and the securing element in the base do not detract from the appearance of the telephone set.

BRIEF DESCRIPTION OF DRAWINGS

FIG. 1 is an exploded perspective view of communication apparatus that incorporates the present invention, the communication apparatus comprising a handset, a base for accommodating the handset in either a face in or face out position and a securing element for supporting the handset on the base in either of these positions, the handset being shown in the face out position;

FIG. 2 is a perspective view of the lower end portion of the handset in the face out position;

DETAILED DESCRIPTION OF THE INVENTION

Figure 3:
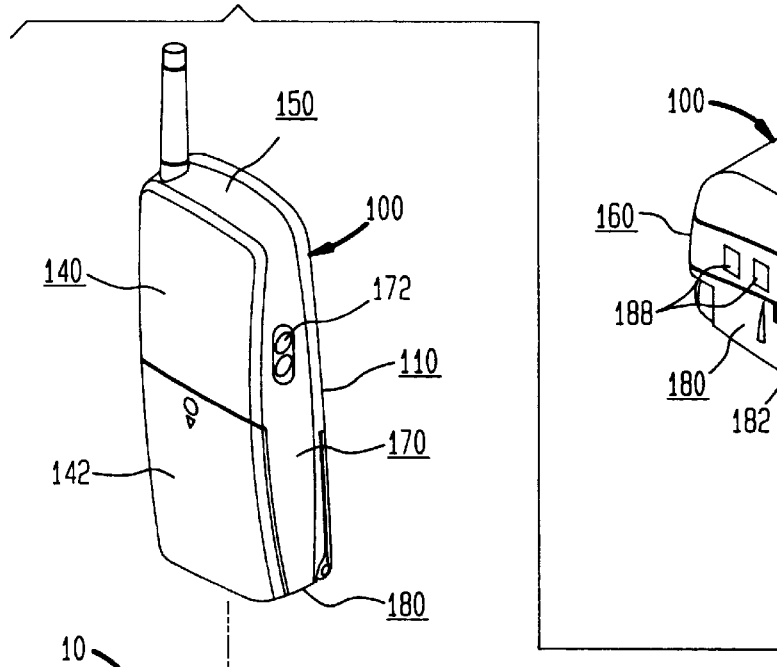
FIG. 3 is the same as FIG. 1 except that the handset is shown in the face in position.

Referring to FIGS. 1 and 3, there is shown an illustrative embodiment of the communication apparatus of the present invention, the illustrative embodiment being a cordless telephone set 10. The set 10 comprises a handset 100, a base 200 on which the handset is positioned when it is at rest and a securing element 300 that mounts on the base and interacts with the handset in a manner later described.

The handset 100 comprises a front 110, a back 140, an upper end 150, sides 160 and 170 and a lower end 180. Located on the front 110 of the handset 100 are communication controls including push buttons 112 for turning the set on and off and accessing features provided by the set 10. The communication controls also include a push button keyboard (not shown) that is covered by a hinged flap 190 when the flap is in the closed position shown. The keyboard is exposed when the flap 190 is rotated to an open position and can then be used to establish a connection with other communication apparatus and/or transmitting information to other communication apparatus.

The front 110 of the handset 100 further includes a concave recess 114 at its upper end having slots 115 for accessing an audio receiver (not shown) and slots 116 at its lower end for accessing an audio transmitter (not shown). Finally, the front 110 of the handset 100 includes a display 120 for displaying information generated by the communication controls of the handset or information received from other communication apparatus.

The back 140 of the handset 100 is adapted to be held in the palm of a users hand when the handset is removed from the base 200, and when so held, the user can use the other hand to operate the communication controls of the handset. The back 140 includes a panel 142 that is user removable to replace a rechargeable battery (not shown) that provides the power needed to operate the set 10 using the communication controls of the handset 100. The sides 160 and 170 of the handset 100 may include controls such as a slide switch 162 for reducing power consumption and a toggle switch 172 for controlling the volume of the audio receiver.

Figure 4:
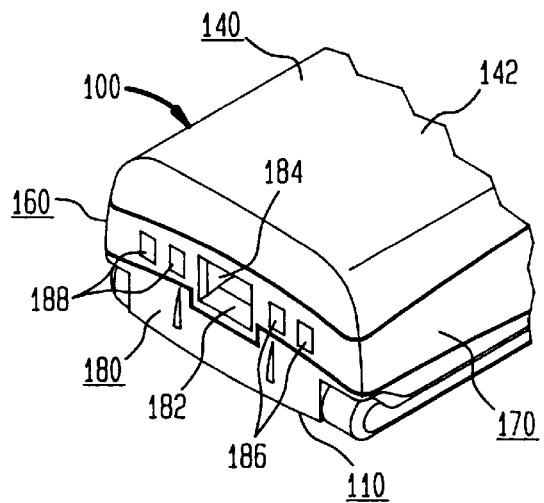
FIG. 4 is a perspective view of the lower end portion of the handset in the face in position.

Referring now to FIGS. 2 and 4, the lower end 180 of the handset 100 includes an opening 182 that is essentially located equidistant between the sides 160 and 170 and between the front 110 and the back 140, and the opening has interior walls 184. The opening 182 is straddled by two pairs of charging contacts 186 and 188 that are used to charge the battery in the handset 100 when the handset is positioned on the base 200.

Referring again to FIGS. 1 and 3, the base 200 includes a front 210 and a back 240. The back 240 is inclined to the front 210 so that it is a greater distance from the front at the upper end of the base 200 than it is at the lower end of the base, providing the base with side portions 245 that have a wedge shaped profile. In addition, a wedge shaped pedestal 250 snap mounts to the back 240 in either of two positions 180 degrees disposed from one another. In a first position, the wedge of the pedestal 250 is additive to the wedge of the base 200. As a result, the incline of the front 210 of the base 200 is increased so that the upper end of the front is a far greater distance from the bottom of the pedestal than the lower end of the front. This provides the desired positive incline to the front 210 when the base 200 is supported on a horizontal surface. In the second position of the pedestal 250, the wedge of the pedestal is subtractive to the wedge of the base 200. As a result, the incline of the front 210 is decreased to the point that the upper end of the front is a somewhat smaller distance from the bottom of the pedestal 250 than the lower end of the front. This provides the desired negative incline to the front 210 when the base 200 is supported on a vertical surface.

The front 210 has an intercom speaker 211 and a push button 212 for initiating or responding to an intercom call. It also includes lights 214 and 215 that respectively indicate when the intercom or phone are in use and lights 217 and 218 that, when the handset 100 is in a rest position on the base 200, respectively indicate when the battery in the handset is charging or fully charged.

The front 210 of the base 200 also has a recess 220 including a first portion 222 that is shaped to be juxtaposed with either the front 110 or back 140 of the handset 100. This enables the handset 100 to be placed in the recess 220 either face in or face out in a parallel position to the front 210 of the base 200. The recess 220 also has a second portion 224 that is deeper than the first portion 222 and is shaped to accommodate the lower end portion of the handset 100. This enables the handset 100 to be placed in the recess 220 in an upright position when the base 200 is supported on a horizontal surface. The recess 220 further includes a lower end 225 that faces the lower end 180 of the handset 100 when the handset is placed in the recess in the parallel position.

Referring also to FIGS. 2 and 4, the second portion 224 of the recess 220 has a pair of resilient charging contacts 226 protruding from its surface. Consequently, when the handset 100 is placed in the second portion 224 in an upright position, these charging contacts 226 are engaged by either the charging contacts 186 or 188 on the lower end 180 of the handset, depending upon whether the front 110 or the back 140 of the handset is facing the lower end of the handset. Similarly, the lower end 225 of the recess 220 has a pair of resilient charging contacts 228 protruding from its surface. Consequently, when the handset 100 is placed in the recess 220 in a parallel position, these charging contacts are engaged by either the charging contacts 186 or 188 on the lower end 180 of the handset, depending upon whether the handset is in a face in or face out position. Thus it is seen that the battery in the handset 100 can be charged in any one of four different positions of the handset on the base 200.

Figure 5:
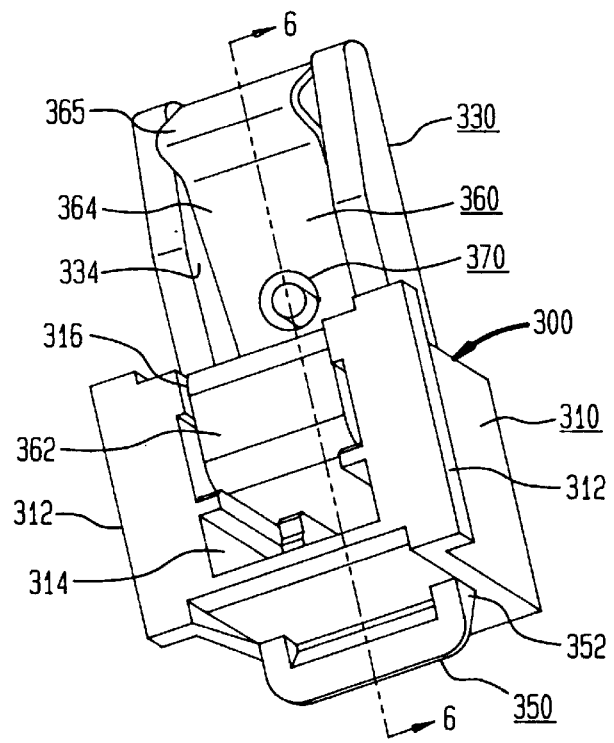
FIG. 5 is an enlarged perspective view of the securing element.
Figure 6:
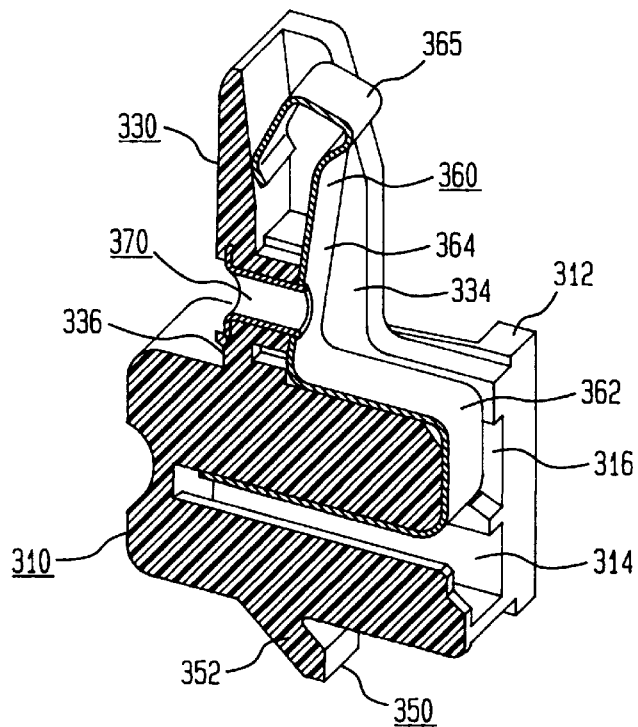
FIG. 6 is a cross-sectional perspective view of the securing element taken along line 6—6 of FIG. 5.

In addition to the charging contacts 228, the lower end 225 of the recess 220 has a cavity 230 that is shaped to accommodate the securing element 300, the cavity including a pair of laterally extending grooves 232 adjacent to a back wall 234. As seen most clearly in FIGS. 5 and 6, the securing element 300 comprises a block like middle portion 310, a long end portion 330 extending from one end of the middle portion, and a short end portion 350 extending from the opposite end of the middle portion. The back end of the middle portion 310 includes a pair of laterally extending flanges 312 of a size to be accommodated by the grooves 232 (FIG. 1) in the cavity 230. The back end of the middle portion 310 also includes a recess 314 and channel 316 that connect to one another.

Figure 7:
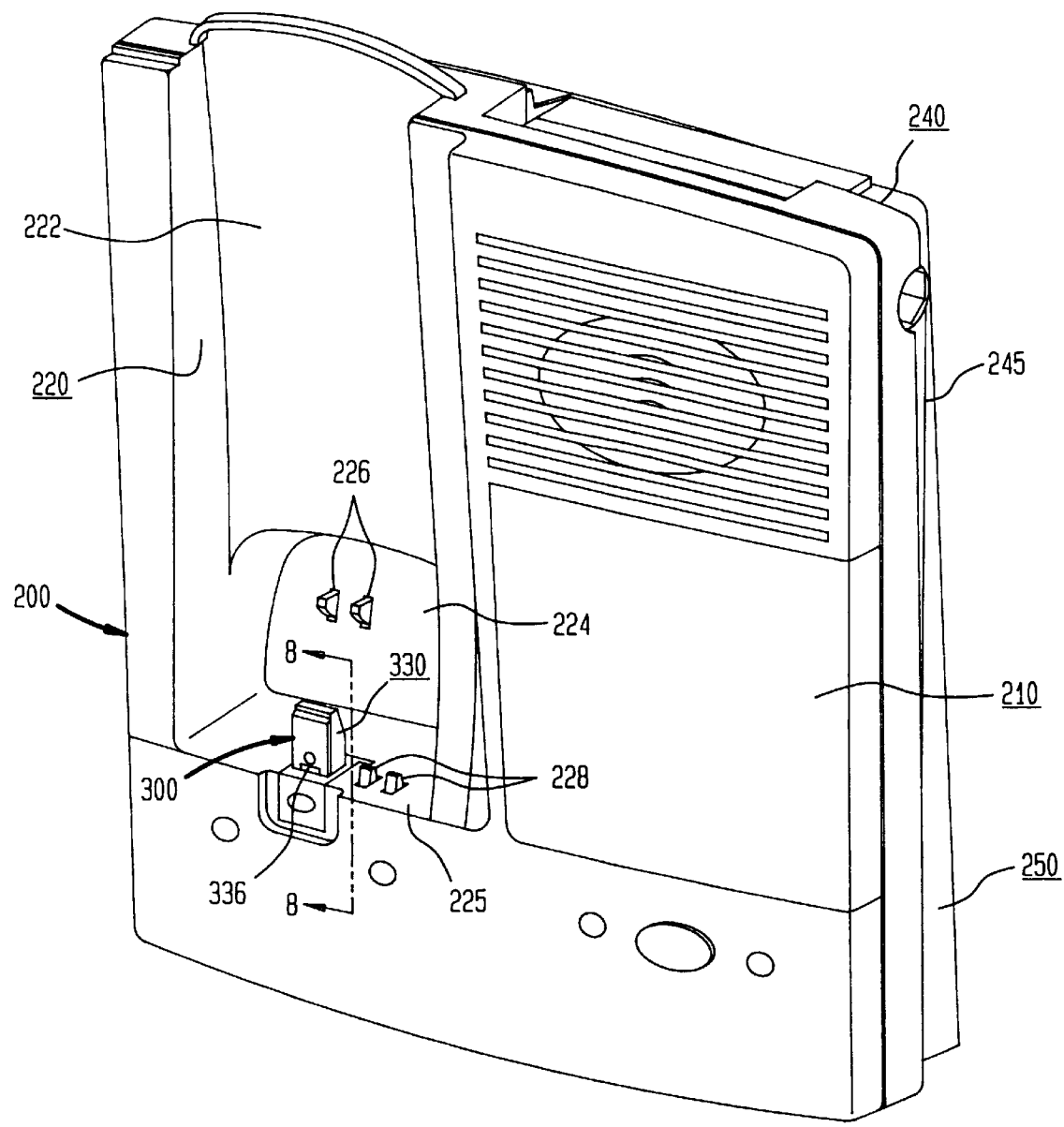
FIG. 7 is a perspective view of the base with the securing element in place and oriented so as to support the handset on the base in either a face in or face out position when the base is positioned on a vertical surface.
Figure 8:
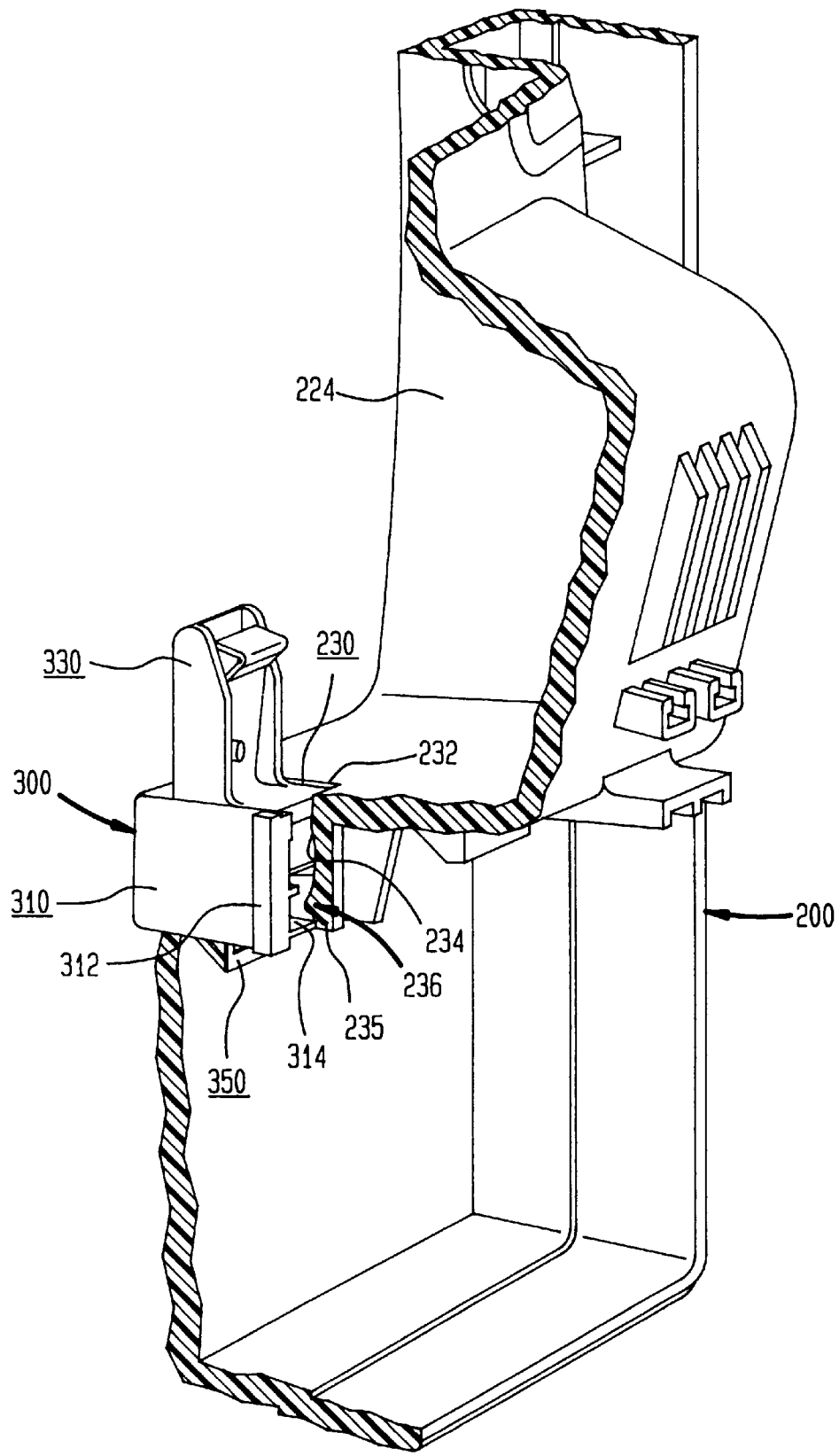
FIG. 8 is an enlarged cross-sectional perspective view taken along line 8—8 of FIG. 7.
Figure 9:
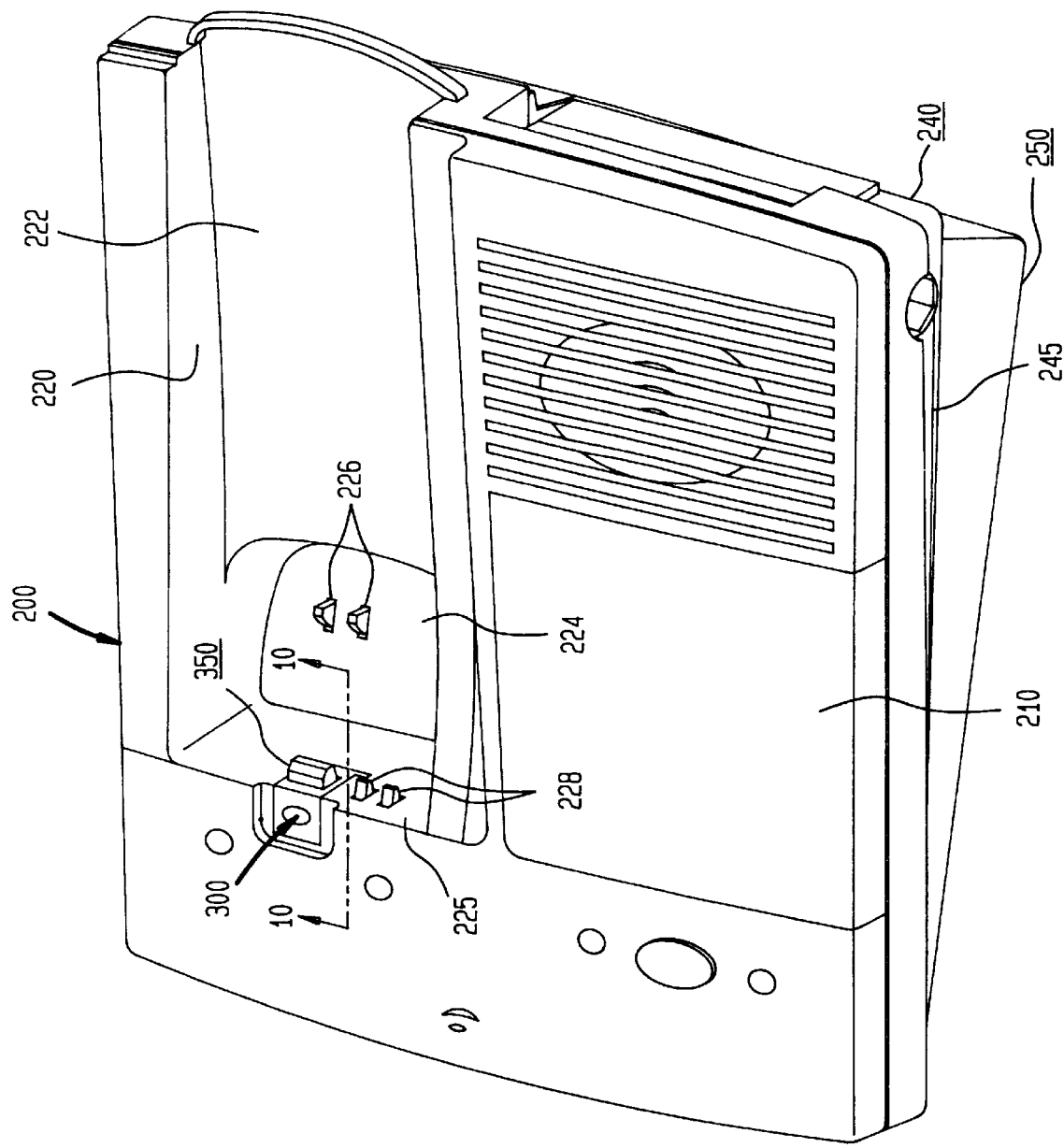
FIG. 9 is a perspective view of the base with the securing element in place and oriented so as to support the handset on the base in either a face in or face out position when the base is positioned on a horizontal surface.
Figure 10:
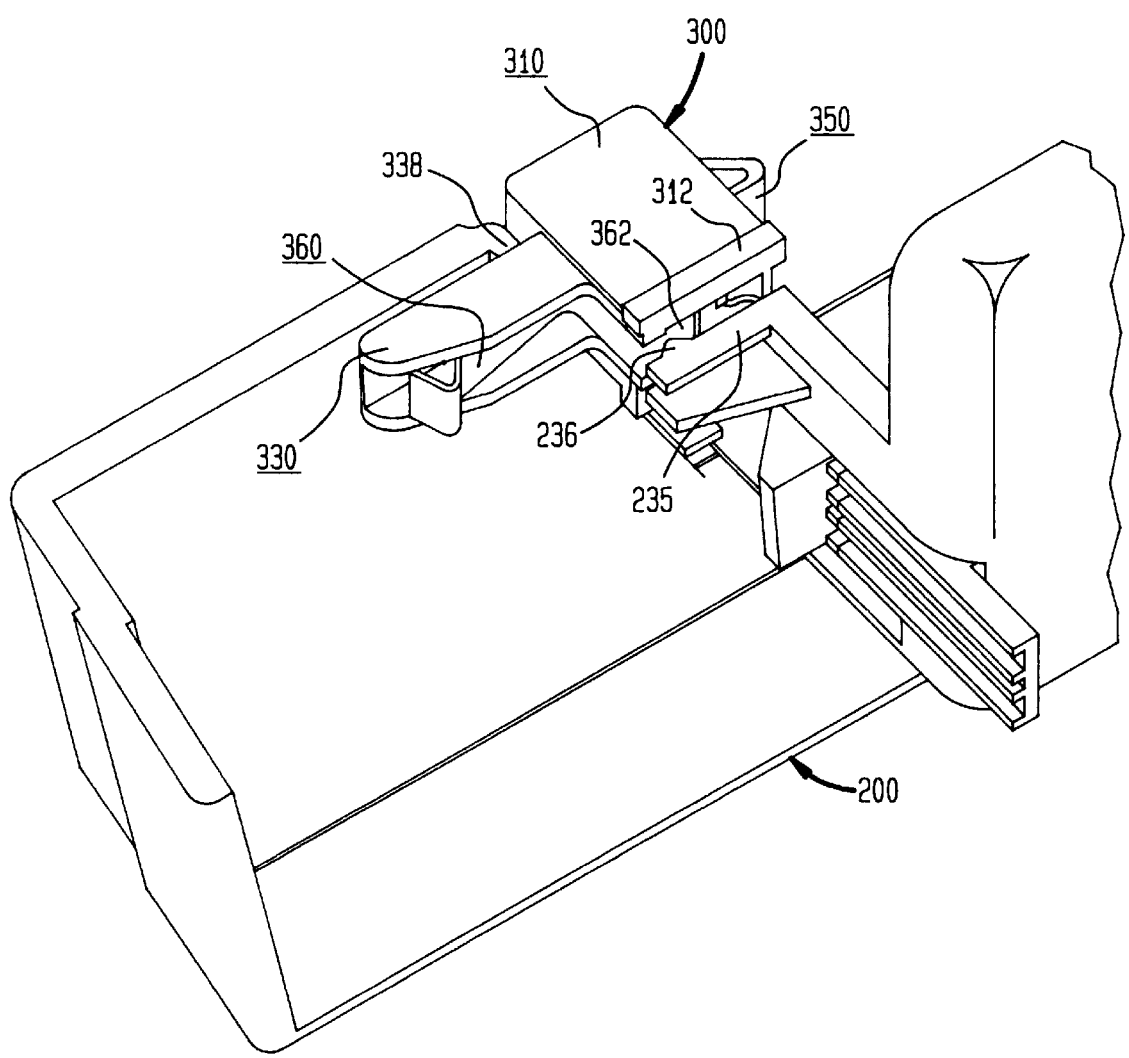
FIG. 10 is an enlarged cross-sectional perspective view taken along line 10—10 of FIG. 9.

The long end portion 330 has a channel 334 in its back that joins with the channel 316 and recess 314 in the middle portion 310, and a serpentine spring member 360 is mounted in the recess and the channels. The spring member 360 includes a U shaped portion 362 that extends from the recess 314 and through the channel 316 in the middle portion 310. The spring member 360 also includes a leg portion 364 that extends through the channel 334 in the long end portion 330, the end of the leg portion bending back on itself to form a nose portion 365 that extends outside the channel. The spring member 360 is held in place by a rivet that extends through a hole in the long end portion 330 and the leg portion 364 and is swaged over against the leg portion. The long end portion 330 also has a recess 336 in its front adjacent to the middle portion 310 (Seen also in FIG. 7). The short end portion 350 includes an angled protrusion 352.

Turning now to FIGS. 1, 3, 7 and 8, when the base 200 is to be supported on a vertical surface, the securing element 300 is mounted in the cavity 230 in the lower end 225 of the recess 220 with the flanges 312 of the securing element positioned in the grooves 232 of the recess, the long end portion 330 of the securing element protruding outwardly from the lower end 225 of the recess, and the short end portion 350 of the securing element extending into the interior of the base through a hole in the cavity. As seen most clearly in FIG. 8, the securing element 300 is held in place by a flexible finger 235 that is integral to the back wall 234 of the cavity 230. The finger 235 has a nose portion 236, and when the securing element 300 is fully inserted into the cavity 230, the nose portion of the finger moves into the recess 314 in the middle portion 310 to frictionally hold the securing element in place.

Referring now to FIGS. 1–4 and 7, with the securing element 300 mounted on the base 200 in this position and the base supported on a vertical surface, the handset 100 is placed in the recess 220 in the base, either face in or face out, in a parallel position to the front 210 by a natural downward motion. As a result, the long end portion 330 of the securing element 300 moves into the opening 182 in the lower end 180 of the handset 100 and the nose portion 365 of the spring member 360 frictionally engages an adjacent wall of the opening. This interaction between the securing element 300 on the base 200 and the opening 182 in the handset serves to secure the handset in place.

Turning now to FIGS. 1,3, 9 and 10, when the base 200 is to be supported on a horizontal surface, the securing element 300 is mounted in the cavity 230 in the lower end 225 of the recess 220 with the flanges 312 of the securing element positioned in the grooves 232 of the recess, the short end portion 350 of the securing element protruding outwardly from the lower end 225 of the cavity, and the long end portion of the securing element extending into the interior of the base through a hole in the cavity. As seen most clearly in FIG. 10, the front end of the cavity 230 includes a protrusion 338, and when the securing element 300 is inserted into the cavity in this position, the recess 336 (FIG. 6) in the securing element is moved into juxtaposition with the protrusion and the protrusion moves into the recess to hold the securing element in place.

Referring now to FIGS. 1–4 and 9, with the securing element 300 mounted on the base 200 in this position and the base supported on a horizontal surface, the handset 100 is placed in the recess 220 in the base, either face in or face out, in a parallel position to the front 210. Since, as described above, when the base is supported on a horizontal surface, the pedestal 250 is oriented so as to provide a positive incline to the front 210, the handset 100 also has a positive incline. As a result, gravity essentially moves the lower end 180 of the handset 100 into juxtaposition with the lower end 225 of the recess 220, thereby placing the short end portion 350 of the securing element 300 in juxtaposition with the opening 182 in the lower end of the handset. The protrusion 352 of the short end portion 350 of the securing element 300 frictionally engages the entrance to the opening 182 and serves to prevent the contacts 186 or 188 on the lower end 180 of the handset 100 from engaging the contacts 228 on the lower end 225 of the recess 220 with too much force.

While the preferred embodiment of this invention has been described in the detailed description, the scope of this invention is defined by the following claims.

What is claimed is:

1. Communication apparatus comprising:
   a first unit that is adapted to be held by a person, the first unit having a front, back, upper end and lower end, the lower end of the first unit extending between the front and the back and having a single opening in it;
   a second unit that includes means for supporting the first unit on the second unit when the first unit is positioned on the second unit, the support means comprising a single securing element that is accommodated by the opening in the lower end of the first unit, the securing element including means for frictionally engaging the opening in the first unit when the securing element is accommodated by the opening, the frictional engagement between the single securing element of the second unit and the single opening in the first unit being the sole means for securing the second unit in place on the first unit.

2. Communication apparatus as in claim 1 wherein the single securing element of the second unit includes a resilient portion for frictionally engaging the opening in the lower end of the first unit.

3. Communication apparatus as in claim 1 wherein the single opening in the lower end of the first unit and the single securing element of the second unit are located so that the securing element of the second unit is accommodated by and frictionally engages the opening in the lower end of the first unit with the first unit positioned on the second unit with either the front or the back of the first unit facing the second unit.

4. Communication Apparatus as in claim 2 wherein the resilient portion of the securing element comprises a spring member.

5. Communication apparatus comprising:
   a handset having a front including communication controls, a back adapted to be held in the palm of a users hand, and a lower end extending between the front and the back, the lower end having a single opening in it that is equidistant between the front and the back and between sides of the handset, the opening including an entrance and an interior wall;
   a base adapted to support the handset, the base including a recess that accommodates the handset, the recess having a lower end that faces the lower end of the handset when the handset is positioned in the recess; and
   a single securing element located in the lower end of the recess, the securing element being in juxtaposition with the opening in the lower end of the handset when the handset is positioned in the recess, the securing element comprising a block like middle portion, a long end portion extending from one end of the middle portion and a short end portion extending from the opposite end of the middle portion, a back end of the middle portion including a pair of laterally extending flanges accommodated by grooves in a cavity in the lower end of the recess in the base, the back end of the middle portion also including a recess and a channel that connect to one another, the long end portion of the securing element having a channel in its back that joins with the channel and recess in the middle portion, a serpentine spring member being mounted in the recess and the channels, the short end portion of the securing element including an angled protrusion, the securing element being accommodated by the cavity in the lower end of the recess in the base with either the long end portion or the short end portion protruding from the lower end of the recess, the spring member of the securing element frictionally engaging the interior wall of the opening in the handset when the long end portion protrudes from the lower end of the recess and the angled protrusion of the securing element frictionally engaging the entrance of the opening in the handset when the short end portion protrudes from the lower end of the recess.

* * * * *